US012620922B2

(12) United States Patent
    Stark

(10) Patent No.:  US 12,620,922 B2
(45) Date of Patent:     May 5, 2026

(54) METHOD FOR OPERATING A DRIVE SYSTEM, AND DRIVE SYSTEM FOR CARRYING OUT A METHOD

(71) Applicant: SEW-EURODRIVE GMBH & CO. KG, Bruchsal (DE)

(72) Inventor: Marcel Stark, Meckesheim (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 248 days.

(21) Appl. No.: 18/290,863

(22) PCT Filed: Jun. 27, 2022

(86) PCT No.: PCT/EP2022/067610
    § 371 (c)(1),
    (2) Date: Jan. 22, 2024

(87) PCT Pub. No.: WO2023/001499
    PCT Pub. Date: Jan. 26, 2023

(65) Prior Publication Data
    US 2024/0258948 A1      Aug. 1, 2024

(30) Foreign Application Priority Data
    Jul. 21, 2021    (DE) .......................... 102021003740.5

(51) Int. Cl.
    H02P 1/30          (2006.01)
    H02P 3/22          (2006.01)
    (Continued)

(52) U.S. Cl.
    CPC ................ H02P 27/08 (2013.01); H02P 3/22 (2013.01); H02P 23/04 (2013.01)

(58) Field of Classification Search
    CPC ........ H02P 27/08; H02P 2209/13; H02P 3/22; H02P 23/04; H02P 27/06
    See application file for complete search history.

(56) References Cited

U.S. PATENT DOCUMENTS

| | | | |
|---|---|---|---|
| 6,473,071 | B2 | 10/2002 | Liu |
| 11,777,434 | B2 | 10/2023 | Wacker |
| 2010/0332065 | A1 | 12/2010 | Lin |

FOREIGN PATENT DOCUMENTS

| | | | |
|---|---|---|---|
| CN | 1242536 | A | 1/2000 |
| CN | 103368538 | A * | 10/2013 |

(Continued)

OTHER PUBLICATIONS

International Report on Patentability issued in corresponding International Application No. PCT/EP2022/067610 dated Jan. 18, 2024, pp. 1-7, English Translation.

(Continued)

*Primary Examiner* — Karen Masih

(74) *Attorney, Agent, or Firm* — Carter, DeLuca & Farrell LLP

(57) ABSTRACT

In a method for operating a drive system and a drive system for carrying out a method, the electric motor is connected to the AC-side connection of an inverter, the DC-side connection of the inverter is connected to the DC-side connection of the rectifier via an inductance, a capacitance is connected to the DC-side connection of the inverter, a series circuit formed from a resistor and a braking chopper is connected to the DC-side connection of the inverter, and the braking chopper is operated with a pulse width modulation frequency, which is determined by a pseudo-random number generator.

22 Claims, 3 Drawing Sheets

(51)  Int. Cl.
      *H02P 23/04*          (2006.01)
      *H02P 27/08*          (2006.01)

(56)                  References Cited

FOREIGN PATENT DOCUMENTS

| | | | | | |
|---|---|---|---|---|---|
| DE | 10212605 | A1 | 10/2003 | | |
| DE | 102014102512 | A1 * | 9/2014 | ......... | B60L 15/2045 |
| DE | 102019005019 | A1 | 1/2020 | | |
| JP | 2019-030044 | A | 2/2019 | | |
| JP | 2020-188636 | A | 11/2020 | | |

OTHER PUBLICATIONS

International Search Report issued in corresponding International Application No. PCT/EP2022/067610 dated Oct. 7, 2022, pp. 1-2, English Translation.

* cited by examiner

METHOD FOR OPERATING A DRIVE SYSTEM, AND DRIVE SYSTEM FOR CARRYING OUT A METHOD

FIELD OF THE INVENTION

The present invention relates to a method for operating a drive system, and a drive system for carrying out a method.

BACKGROUND INFORMATION

In certain conventional systems, a drive system has an electric motor fed by an inverter.

German Patent Document No. 10 2019 005 019 describes a method for operating a drive system.

An electric vehicle drive is described in U.S. Patent Application Publication No. 2010/0332065.

An electromotive drive system is described in Japanese Patent Document No 2019-30044.

A converter is described in Chinese Patent Document No. 1242536.

A power converter is described in Japanese Patent Document No. 2020-188636.

SUMMARY

Example embodiments t of the present invention provide a drive system that is environmentally friendly.

According to an example embodiment of the present invention, in a method for operating a drive system, which has a rectifier and at least one inverter with an electric motor, the electric motor is connected to the AC-side connection of the inverter, the DC-side connection of the inverter is connected to the DC-side connection of the rectifier via an inductance, e.g., a line inductance, a capacitance is connected to the DC-side connection of the inverter and/or to the DC-side connection of the rectifier, e.g., a non-polar capacitor, a film capacitor, etc., a respective series circuit respectively formed from a resistor and a controllable semiconductor switch, i.e., a braking chopper, is connected to the DC-side connection of the inverter and/or to the DC-side connection of the rectifier, the braking chopper, in the time period in which the braking chopper is operated, is operated with a pulse width modulation frequency f which is spaced apart from the resonant frequency of the oscillating circuit, e.g., resonant circuit, formed from the inductance and the capacitance or capacitances, and the pulse width modulation frequency f is determined by a pseudo-random number generator, e.g., for a respective time duration.

Thus, noise emissions are reduced when the braking resistor is in operation. This is because the timing change of the pulse width modulation frequency prevents a resonance frequency from rising and the emitted sound is also less disturbing for people. Overall, the radiated energy is more widely distributed in the frequency range than when operating with just a single pulse width modulation frequency. Since the braking chopper is not only operated by the pseudo-random number generator as a function of time, but the operating times are also dependent on the DC voltage, e.g., the intermediate circuit voltage, environmental protection is further improved. This is because noise emissions are reduced. In addition, the risk of exciting a resonant frequency of an electrical oscillation can be reduced.

According to example embodiments, the pulse width modulation frequency f is spaced apart from harmonic oscillations, e.g., harmonics, of the resonant frequency of the oscillating circuit, e.g., resonant circuit, formed from the inductance and the capacitance or capacitances. Thus, there is no excitation of an electrical oscillation in the intermediate circuit.

According to example embodiments, the pulse width modulation period duration, i.e., the reciprocal value of the pulse width modulation frequency, is determined by the counting down of a counter loaded with a start value at the beginning of the pulse width modulation period, carried out in time with a first clock signal, and the start value is determined by the pseudo-random number generator. For example, the pseudo-random number generator operates in time with a second clock signal. Thus, noise emissions are reduced, thereby improving environmental protection.

According to example embodiments, the pseudo-random number generator has a shift register fed back via a logic element. For example, the logic element supplies a non-vanishing start value to the shift register upon switch-on, and thereafter, for example, during further operation, the result of a logical link of output signals of the shift register is fed to the input of the shift register. Thus, ready, cost-effective implementation is possible.

According to example embodiments, the pseudo-random number generator has flip-flops, e.g., toggle flip-flops, e.g., T-flip-flops, connected in series, whose clock inputs are synchronously supplied with the same clock signal, e.g., with the second clock signal, and whose outputs are fed to a counter as a start value, e.g., a start value represented digitally in parallel, e.g., after the counter has previously counted down to one and/or when the counter is started, and outputs of the flip-flops are fed to a logic element whose output is fed to the input of a first of the flip-flops connected in series. Thus, ready, cost-effective implementation is possible.

According to example embodiments, the logical link is an EXOR link, e.g., an exclusive-OR link, or is composed only of EXOR links, e.g., exclusive-OR links. Thus, ready, cost-effective implementation is possible.

According to example embodiments, the logical link acts as a parity generator. Thus, an appropriate function can be used.

According to example embodiments, the first clock signal is asynchronous with the second clock signal. For example, the first clock signal is generated using a different time base than the second clock signal, a first crystal oscillator acts as the time base for the first clock signal and a second crystal oscillator, which is different therefrom, acts as the time base for the second clock signal. Thus, an almost continuous frequency distribution is possible despite the use of a pseudo-random number generator.

According to example embodiments, the time base of the pseudo-random number generator is independent of the time base of the pulse width modulation frequency generation, and/or the time base of the pseudo-random number generator is asynchronous with the time base of the pulse width modulation frequency generation. Thus, a ready implementation provides for a broadening of the discrete distribution in frequency space.

According to example embodiments, the reciprocal value of the time duration T is greater than the resonant frequency of the resonant circuit, e.g., the oscillating circuit, formed from the inductance and the capacitance or capacitances. Thus, the pulse width modulation frequency is spaced apart from the resonance frequency and no resonance oscillation can be excited.

According to example embodiments, the braking chopper is always switched off when the intermediate circuit voltage falls below a first threshold value. Thus, lower losses occur and the inverters can be supplied with full power.

According to example embodiments, the braking chopper is switched on when the intermediate circuit voltage exceeds a first threshold value, and, for example, if either no switch-on has previously taken place or the last switch-on was more than a determined time duration T ago, and the time duration T equals the reciprocal value of the frequency f. Thus, an excessive intermediate circuit voltage can be prevented.

According to example embodiments, the second switching threshold is greater than the first switching threshold. Thus, the electronics can be protected above the second threshold value by permanently opening the braking chopper, i.e., the controllable semiconductor switch. Below the first threshold value, the semiconductor switch also remains permanently open. Only for voltage values between the first and second threshold value is the semiconductor switch operated with pulse width modulation.

According to an example embodiment of the present invention, in a drive system for carrying out the aforementioned method, a counter counting down from a respective start value in time with a first clock signal determines the pulse width modulation period duration, i.e., the reciprocal value of the pulse width modulation frequency, a pseudo-random number generator operated in time with a second clock signal generates the start value, a first time base feeds the first clock signal to the counter, and a second time base feeds the second clock signal to the counter.

Thus, different time bases can be used and periodicities can be reduced. For example, the sequence of pulse width modulation frequencies generated by the pseudo-random number generator is deterministic and thus also periodic. Although an apparently random sequence of pulse width modulation frequencies can be generated by a suitable configuration of the pseudo-random number generator, the same sequence is generated with the same start value and thus there is a periodicity. By using time bases that are different, e.g., independent of each other, i.e., asynchronous, the periodicity is no longer strict, but changed to a quasi-periodicity, which corresponds to a broadening of the respective frequency lines in the frequency space. By broadening all lines of the discrete spectrum, a quasi-continuous spectrum is created.

According to example embodiments, the second time base is arranged independently of the first time base such that the first time base operates asynchronously to the second time base, i.e., the first clock signal is asynchronous with the second clock signal. Thus, on the one hand, a pseudo-random number generator is used and a periodic repetition of a sequence of pulse width modulation frequencies could occur, which corresponds to a discrete and not fully continuous distribution of the pulse width modulation frequencies in the frequency band used. On the other hand, due to the asynchrony, the sequence of these frequencies is not synchronous with the pulse width modulation itself. In this manner, oscillation and/or beat frequencies are prevented. In the frequency space, the actually discrete distribution of frequencies is blurred, approaching a continuous distribution.

Further features and aspects of example embodiments of the present invention are described in more detail below with reference to the appended schematic Figures.

DETAILED DESCRIPTION

Figure 1:
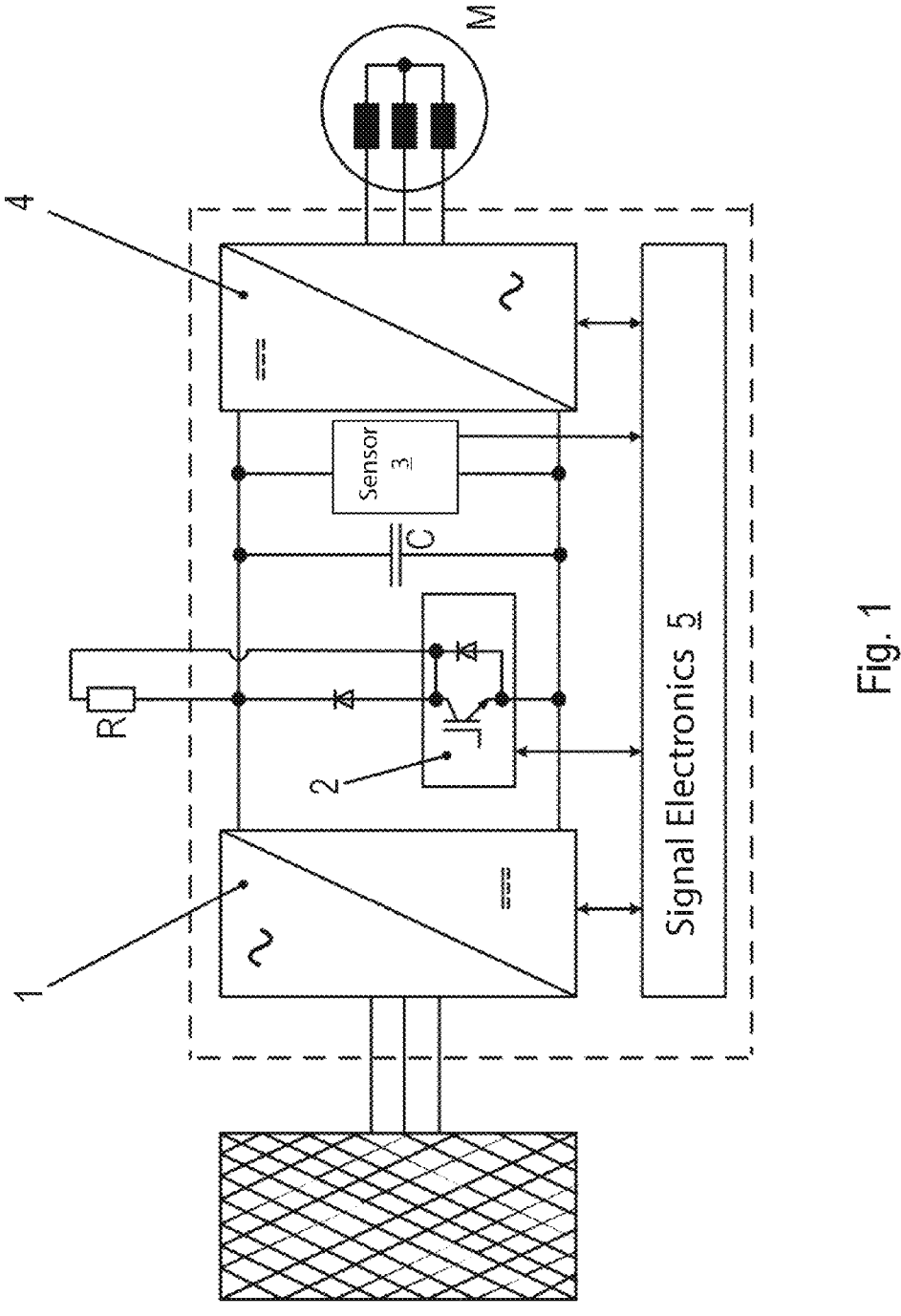
FIG. 1 illustrates the intermediate circuit of a converter.

As illustrated in the Figures, the converter has a rectifier 1 whose DC-side connection has the DC side-connection of an inverter 4. In addition, a capacitance, e.g., an intermediate circuit capacitor, is arranged in parallel with the DC-side connection of the inverter 4.

A sensor 3 is used to capture the voltage present at the DC-side connection of the inverter 4 and the captured value is fed to the signal electronics 5.

Also arranged parallel to the DC-side connection of the inverter 4 is a series circuit formed from a resistor R and a controllable semiconductor switch 2.

The resistor R is arranged as a braking resistor. If the voltage applied to the series voltage exceeds a threshold value, electrical power is applied to the braking resistor.

An electric motor M, e.g., a three-phase motor, is fed from the AC-side connection of the inverter 4.

Figure 2:
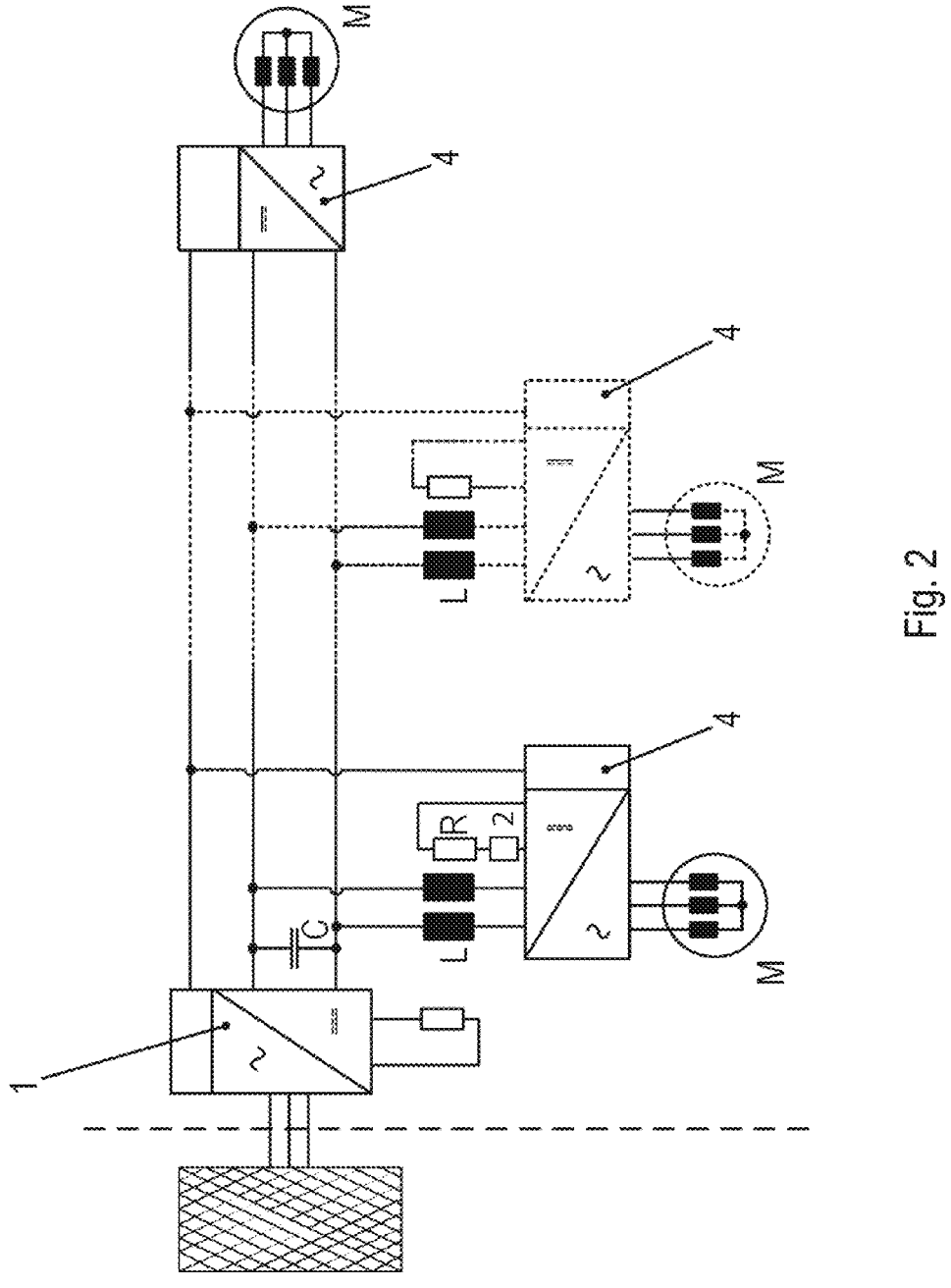
FIG. 2 illustrates shows a drive system having a plurality of inverters 4.

As illustrated in FIG. 2, in a drive system, a plurality of inverters 4, to each of whose AC-side connections an electric motor M is connected, can be supplied in parallel from a mains-fed rectifier 1. A capacitance C is provided for smoothing the voltage applied to the DC-side of the rectifier 1.

The line inductances of the DC voltage busbar between the DC-side connections of the inverters 4 and the rectifier 1 are indicated by the inductance L. These line inductances are, for example, generated by conductor rails that connect the DC-side connections of the inverters 4 and the DC-side connection of the rectifier 1.

A series circuit that includes a braking resistor R and a controllable semiconductor switch is assigned to each inverter 4, and the series circuit is supplied from the DC-side connection of the inverter 4.

A series circuit that includes a braking resistor R and a controllable semiconductor switch is also assigned to the DC-side connection of rectifier 1, and the series circuit is supplied from the DC-side connection of rectifier 1.

The respective controllable semiconductor switch is controlled in a pulse-width modulated manner when the voltage at the respective DC-side connection exceeds a threshold value.

However, if a threshold value that is even higher than the threshold value is exceeded, the controllable semiconductor switch is switched off, i.e., opened.

In pulse width modulated operation, the pulse width modulation frequency is changed repeatedly over time. The frequency band covered by the pulse width modulation frequencies used in this process is spaced apart from the resonant frequency of the oscillating circuit formed from the line inductances L and the capacitance C. In addition, the frequency band is spaced apart from the harmonics of this resonance frequency.

If, for example, the resonance frequency is 2.5 kHz, the frequency band is, for example, set between 3 kHz and 4.5 kHz.

The pulse width modulation frequencies are determined as a pseudo-random sequence.

Figure 3:
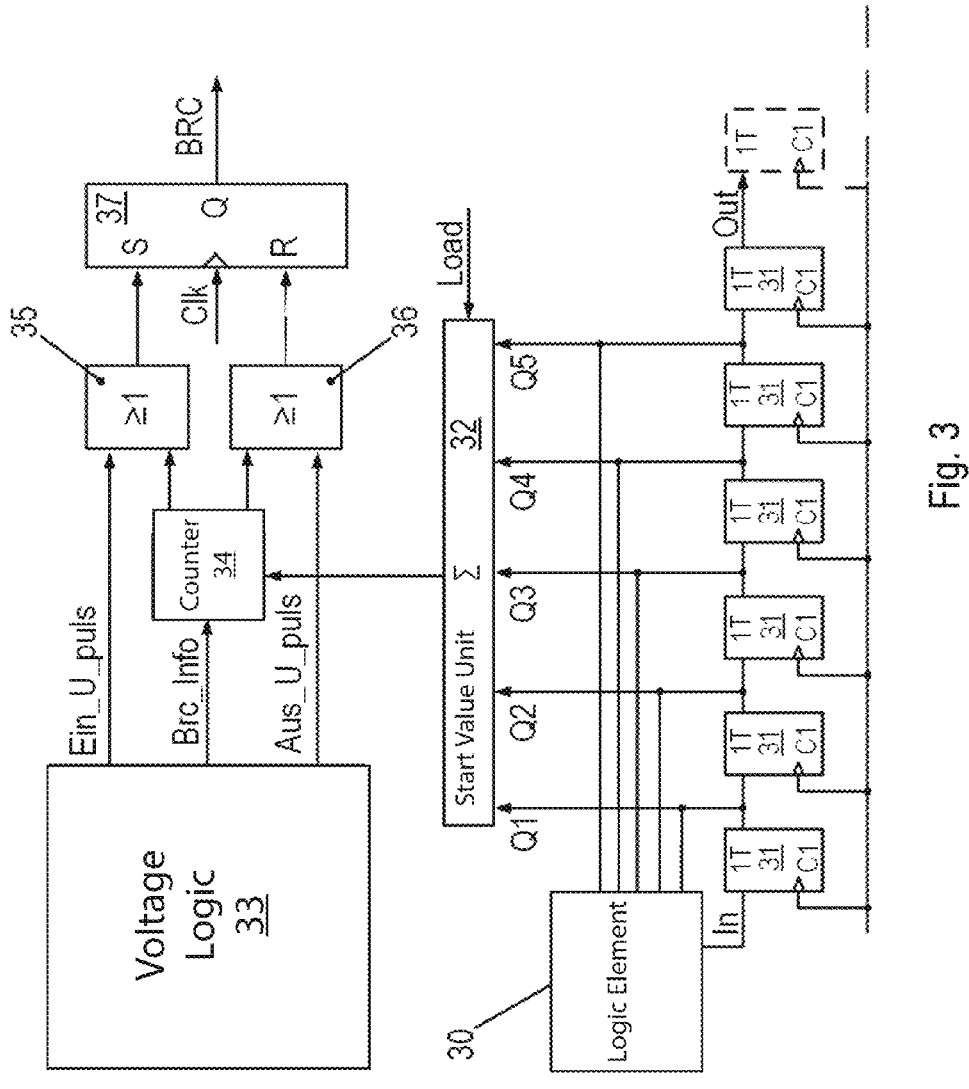
FIG. 3 is a schematic view of a control signal generation unit.

As illustrated in FIG. 3, a pseudo-random number generator is used for this purpose, which includes a series connection of flip-flops 31, e.g., toggle flip-flops, e.g., T-flip-flops, and the clock inputs of the flip-flops 31 are connected to one another. The output of a respective flip-flop 31 is connected to the input of the respective downstream flip-flop 31. In addition, the outputs of all flip-flops 31 are fed to a start value unit 32, which generates a start value therefrom for a counter 34.

Outputs from, e.g., two or more of the flip-flops 31 are fed to a logic element 30 and logically linked, e.g., with EXOR links, i.e., for example, exclusive-OR links.

For example, the logic element 30 is a parity generator.

The result of the link is fed by the logic element 30 as a start value to the first of the flip-flops 31 when a load signal LOAD is fed to the start value unit 32.

In this manner, the start value is generated as a random value, in that the series connection with the logic element 30 is configured as a fed-back shift register.

The counter 34 increments the start value according to the system clock, so that the counter reading of counter 34 is reduced from the start value when the release signal BRC_info.

The counter reading is fed to the OR elements 35 and 36, which link a voltage logic 33 with the respective Ein_U-_puls and Aus_U_puls signals.

This makes it possible to control the DC voltage with a pseudo-fuzzy logic that works with voltage conditions and time conditions. In parallel to fixed voltage-based switch-on and switch-off thresholds, a time-dependent control of the semiconductor switch by the counter 34 is superimposed. The target frequency is maintained.

During the controlling, the time intervals, i.e., the target period, of the rising edges of the control signal of the semiconductor switch, e.g., in particular the switching on, and the intervals of the falling edge of the control signal, e.g., in particular the switching off, are monitored in relation to each other. If a time condition exceeds the target period, this leads to a forced switchover of the semiconductor switch. The voltage- and time-related criteria are valid as long as the DC voltage, i.e., the intermediate circuit voltage, is in the range of the overvoltage switch-off threshold and lower switch-on threshold. Otherwise, the semiconductor switch is switched to high resistance, i.e., opened. This also provides for operation between the switch-on threshold, i.e., the first threshold value, and an overvoltage switch-off threshold. Here, the controller works with the parameterized pulse width modulation ratio of a minimum switch-on time or minimum switch-off time.

Regardless of the results of the link, the logic element 30 generates a default value other than zero at its output upon switch-on, which default value is present at the input In of the first of the flip-flops 31. After switch-on, i.e., during operation, the logic element 30 applies the result of the logic link, e.g., of the EXOR link, to the input In of the first of the flip-flops 31.

The output signal of the first OR element is fed to the set input of a bistable multivibrator 37.

The output signal of the second OR element is fed to the reset input of the bistable multivibrator 37.

Thus, if the DC voltage, e.g., the intermediate circuit voltage, is between the two threshold values, the controllable semiconductor switch is switched off when, by counting down the start value to one, a time duration T is reached, which has elapsed since the previously executed switch-off of the controllable semiconductor switch, and the controllable semiconductor switch is switched on when the time duration T has elapsed after the previously executed switch-on.

The effect of these voltage conditions and time conditions is that the braking chopper, when it is operated, is always operated at the frequency f=1/T determined by the start value. Otherwise it remains switched off.

For example, control electronics as illustrated in FIG. 3 are provided for each controllable semiconductor switch of each of the series circuits arranged at the DC-side connections of the inverters 4.

In example embodiments, in contrast to FIG. 2, a series circuit that includes a braking resistor and a controllable semiconductor switch is not arranged at each DC-side connection of each inverter, but only a single series circuit that includes a braking resistor and a controllable semiconductor switch in the intermediate circuit, e.g., at the DC-side connection of the rectifier.

LIST OF REFERENCE CHARACTERS

1 Rectifier
2 Controllable semiconductor switch
3 Sensor for capturing the voltage
4 Inverter
5 Signal electronics
30 Logic element
31 Flip-flop, e.g., toggle flip-flop
32 Start value unit
33 Voltage logic
34 Counter
35 OR element
36 OR element
37 Bistable multivibrator, e.g., flip-flop
M Electro motor
L Line inductance
C Capacitance
R Braking resistor

The invention claimed is:

1. A method of operating a drive system having a rectifier and at least one inverter with an electric motor, the electric motor connected to an AC-side connection of the inverter, a DC-side connection of the inverter connected to a DC-side connection of the rectifier via an inductance, a capacitance connected to the DC-side connection of the inverter and/or to the DC-side connection of the rectifier, a respective series circuit respectively formed from a resistor and a controllable semiconductor switch is connected to the DC-side connection of the inverter and/or to the DC-side connection of the rectifier, comprising:

operating the series circuit, in a time period in which the series circuit is operated, with a pulse width modulation frequency is spaced apart from a resonant frequency of an oscillating circuit that includes the inductance and the capacitance; and generating the pulse width modulation frequency by a pseudo-random number generator.

2. The method according to claim 1, wherein the inductance includes a line inductance, the capacitance includes a non-polar capacitor and/or a film capacitor, the series circuit arranged as a braking chopper, the oscillating circuit arranged as a resonant circuit, the generating including generating the pulse width modulation frequency by the pseudo-random number generator for a respective time duration.

3. The method according to claim 1, wherein the pulse width modulation frequency is spaced apart from harmonic oscillations and/or harmonics of the resonant frequency of the oscillating circuit.

4. The method according to claim 1, wherein a pulse width modulation period duration is determined by counting down of a counter loaded with a start value at a beginning of the pulse width modulation period, carried out in time with a first clock signal, and the start value is determined by the pseudo-random number generator.

5. The method according to claim 4, wherein the pseudo-random number generator operates in time with a second clock signal.

6. The method according to claim 1, wherein the pseudo-random number generator has a shift register fed back via a logic element.

7. The method according to claim 6, wherein the logic element feeds a non-vanishing start value to the shift register upon switch-on, and thereafter, a result of a logical link of output signals of the shift register is fed to an input of the shift register.

8. The method according to claim 1, wherein the pseudo-random number generator includes flip-flops, connected in series, having clock inputs synchronously supplied with a same clock signal and outputs fed to a counter as a start value, and outputs of the flip-flops are fed to a logic element having an output fed to the input of a first of the flip-flops connected in series.

9. The method according to claim 7, wherein the logical link includes an EXOR link.

10. The method according to claim 5, wherein the first clock signal is asynchronous with the second clock signal.

11. The method according to claim 10, wherein the first clock signal is generated using a different time base than the second clock signal, a first crystal oscillator is arranged as the time base for the first clock signal and a second crystal oscillator is arranged as the time base for the second clock signal.

12. The method according to claim 1, wherein a time base of the pseudo-random number generator is independent of the time base of a pulse width modulation frequency generation.

13. The method according to claim 1, wherein a time base of the pseudo-random number generator is asynchronous with a time base of a pulse width modulation frequency generation.

14. The method according to claim 1, wherein the generating including generating the pulse width modulation frequency by the pseudo-random number generator for a respective time duration, a reciprocal value of the time duration is greater than the resonant frequency.

15. The method according to claim 1, the series circuit is always switched off when an intermediate circuit voltage falls below a threshold value.

16. The method according to claim 1, wherein the series circuit is switched on when an intermediate circuit voltage exceeds a first threshold value.

17. The method according to claim 1, wherein the series circuit is switched on when an intermediate circuit voltage exceeds a first threshold and if either no switch-on has previously taken place or a last switch-on was more than a determined time duration, the time duration T equaling a reciprocal value of the frequency.

18. The method according to claim 15, wherein the series circuit is switched on when an intermediate circuit voltage exceeds a first threshold value, the first threshold value being greater than the second threshold value.

19. The method according to claim 1, wherein a counter counting down from a respective start value in time with a first clock signal determines a pulse width modulation period duration, a pseudo-random number generator operated in time with a second clock signal generates the start value, a first time base feeds the first clock signal to the counter, and a second time base feeds a second clock signal to the counter.

20. The method according to claim 19, wherein the second time base is independent of the first time base, the first time base being asynchronous with the second time base, the first clock signal being asynchronous with the second clock signal.

21. A method of operating a drive system having a rectifier and at least one inverter with an electric motor, the electric motor connected to an AC-side connection of the inverter, a DC-side connection of the inverter connected to a DC-side connection of the rectifier via an inductance, a capacitance connected to the DC-side connection of the inverter and/or to the DC-side connection of the rectifier, a respective series circuit respectively formed from a resistor and a controllable semiconductor switch is connected to the DC-side connection of the inverter and/or to the DC-side connection of the rectifier, comprising:

operating the series circuit, in a time period in which the series circuit is operated, with a pulse width modulation frequency is spaced apart from a resonant frequency of an oscillating circuit that includes the inductance and the capacitance; and generating the pulse width modulation frequency by a pseudo-random number generator;

wherein the pseudo-random number generator includes a shift register fed back via a logic element, the logic element feeding a start value to the shift register upon switch-on, and thereafter, a result of a logical linking of output signals of the shift register is supplied to an input of the shift register, the logical link being arranged as a parity generator.

22. A method of operating a drive system having a rectifier and at least one inverter with an electric motor, the electric motor connected to an AC-side connection of the inverter, a DC-side connection of the inverter connected to a DC-side connection of the rectifier via an inductance, a capacitance connected to the DC-side connection of the inverter and/or to the DC-side connection of the rectifier, a respective series circuit respectively formed from a resistor and a controllable semiconductor switch is connected to the DC-side connection of the inverter and/or to the DC-side connection of the rectifier, comprising:

operating the series circuit, in a time period in which the series circuit is operated, with a pulse width modulation frequency is spaced apart from a resonant frequency of an oscillating circuit that includes the inductance and the capacitance; and generating the pulse width modulation frequency by a pseudo-random number generator;

wherein the pseudo-random number generator has a shift register fed back via a logic element;

wherein the logic element feeds a non-vanishing start value to the shift register upon switch-on, and thereafter, a result of a logical link of output signals of the shift register is fed to an input of the shift register; and wherein the logical link acts is in arranged as a parity generator.

* * * * *